United States Patent [19]

Jesse

[11] Patent Number: 4,664,715

[45] Date of Patent: May 12, 1987

[54] PREPARATION OF LAKES HAVING IMPROVED PERFORMANCE CHARACTERISTICS

[75] Inventor: Joachim Jesse, Weisenheim, Fed. Rep. of Germany

[73] Assignee: BASF Aktiengesellschaft, Fed. Rep. of Germany

[21] Appl. No.: 780,317

[22] Filed: Sep. 26, 1985

[30] Foreign Application Priority Data

Sep. 27, 1984 [DE] Fed. Rep. of Germany ....... 3435433

[51] Int. Cl.$^4$ .............................................. C04B 14/00
[52] U.S. Cl. .................................... 106/309; 106/289
[58] Field of Search ............................... 106/309, 289

[56] References Cited

U.S. PATENT DOCUMENTS

| | | | |
|---|---|---|---|
| 3,953,218 | 4/1976 | Pollard | 106/31 |
| 3,994,392 | 11/1976 | Kajiyama | 148/6.14 |
| 4,053,464 | 10/1977 | Roueche | 534/820 |
| 4,072,622 | 2/1978 | Kuhling et al. | 252/174.25 |
| 4,142,914 | 3/1979 | Bast et al. | 106/308 F |

FOREIGN PATENT DOCUMENTS

1072702 6/1967 United Kingdom .

*Primary Examiner*—Paul Lieberman

*Attorney, Agent, or Firm*—Oblon, Fisher, Spivak, McClelland & Maier

[57] ABSTRACT

Improved lakes based on basic dyes and heteropolyacids (PM, PTM, SM, PSTM and STM) are prepared by a process in which the lakes are heated to 50°–100° C. at pH 2–5 in the presence of (1) primary, secondary or tertiary aliphatic amines, (2) alkylamino-$C_2$-$C_8$-alkanoic acids, (3) diaryl- or triarylamines, (4) acidic or neutral phosphates based on fatty alcohols, their ethylene oxide or propylene oxide/ethylene oxide adducts, polypropylene glycol, polyethylene glycol, or propylene oxide/ethylene oxide block copolymers, (5) sulfuric acid half esters of fatty alcohols, of their ethylene oxide adducts or alkylphenol/ethylene oxide adducts, (6) $C_8$-$C_{20}$-alkanoic acids and alkenoic acids, alkylbenzenesulfonic acids, alkylnaphthalenesulfonic acids or dialkylsulfimides, (7) alkylphenol/ethylene oxide adducts, alkanol/ethylene oxide adducts or alkylamine/ethylene oxide adducts, (8) propylene glycols or propylene oxide/ethylene oxide block copolymers of alkanediols or -polyols or (9) naphthols or alkylphenols. The pigments obtained possess improved tinctorial properties and performance characteristics and are readily dispersible in printing inks. The prints exhibit high gloss and high transparency.

16 Claims, No Drawings

PREPARATION OF LAKES HAVING IMPROVED PERFORMANCE CHARACTERISTICS

The conversion of basic dyes, preferably triphenylmethane and xanthene dyes, to lakes with heteropolyacids based on phosphoric, tungstic, molybdic and/or silicic acid leads to pigments which are processed in large amounts to produce printing inks.

The synthesis of these pigments is described in FIAT Final Report, Vol. III, No. 1313 (also see German Laid-Open Application DOS 2,707,972 and Industrial and Engineering Chemistry, part 8, 1955, page 1507 et seq.).

The pigments prepared by the prior art processes give hard agglomerates and aggregates when the aqueous press cake is dried, and it is therefore difficult to convert these dried pigments to offset printing inks which are readily dispersible and possess a small particle size.

Moreover, nitrocellulose-containing printing inks which contain these pigments frequently exhibit insufficient gloss and poor transparency on acetate film and aluminum foil.

It is an object of the present invention to prepare softer-textured lakes which are readily dispersible in printing inks, in particular in offset and nitrocellulose-containing printing inks, and possess improved gloss and better transparency.

We have found that this object is achieved, and that lakes which possess improved performance characteristics and are obtained from basic dyes and heteropolyacids based on phosphoric, tungstic, molybdic and/or silicic acid are obtained by after-treating the crude pigment, obtained in the laking procedure, in aqueous suspension at elevated temperatures, if (1) primary, secondary or tertiary aliphatic amines which carry one or more $C_{10}$–$C_{20}$-alkyl and/or $C_8$–$C_{20}$-alkoxy$C_2$–$C_4$-alkyl groups,
(2) N-$C_8$–$C_{20}$-alkylamino-$C_2$–$C_8$-alkanoic acids,
(3) diaryl- or triarylamines,
(4) acidic or neutral phosphates based on a fatty alcohol, a fatty alcohol oxyalkylate, polypropylene glycol, polyethylene glycol or block copolymers of propylene oxide and ethylene oxide,
(5) sulfuric acid half esters based on $C_{10}$–$C_{20}$-fatty alcohols, fatty alcohol/ethylene oxide adducts or $C_5$–$C_{20}$-alkylphenol/ethylene oxide adducts,
(6) $C_8$–$C_{20}$-alkane- or alkenesulfonic acids, $C_6$–$C_{20}$-alkylbenzenesulfonic acids, $C_1$–$C_{20}$-alkylnaphthalenesulfonic acids or di-$C_6$–$C_{20}$-alkylsulfimides,
(7) ethylene oxide adducts of $C_1$–$C_{20}$-alkylphenols, $C_8$–$C_{20}$-alkanols or $C_{10}$–$C_{20}$-alkylamines, the adducts containing not less than 5 ethylene oxide radicals,
(8) propylene glycols or block copolymers based on alkanediols or -polyols of 2 to 8 carbon atoms with propylene oxide and ethylene oxide, or
(9) naphthols or $C_1$–$C_{20}$-alkylphenols, or mixtures of these agents, are added to the aqueous mixture before, during or after the laking procedure, and the crude pigment in the aqueous suspension is heated to 50°–100° C. at pH 2–5.

The pigment is then isolated, washed and dried.

The products are readily dispersible in solutions of printing ink binders, in particular in offset printing inks. The inks have a low particle size, and the prints obtainable with these inks exhibit high gloss and high transparency.

The process for the preparation of the lakes from basic dyes and heteropolyacids, and the preparation of the heteropolyacids required for converting the dyes to lakes are known (FIAT, Final Report Vol. III, 1313). The basic dyes which are suitable for the preparation of lakes which can be used for pigmenting finishes and printing inks are also known (e.g. V. Oliver "Basic Dye Pigments (Permanent)" in: Pigment Handbook, Vol. I, pages 605/616, Wiley & Sons, New York, London (1973); FIAT Final Report, Loc. cit.).

The central feature of the process according to the invention is the fact that the lake obtained in the conversion, also referred to below as the crude pigment, is heated, in the form of an aqueous suspension, to 50°–100° C. in the presence of the agents (1) to (9) used according to the invention, or a mixture of these, at a pH of from 2 to 5.

The agents (1) to (9) used according to the invention, and mixtures of these, are also referred to below as additives.

Suitable additives for the process are:
(1) primary, secondary or tertiary aliphatic amines which carry one or more $C_{10}$–$C_{20}$-alkyl and/or $C_8$–$C_{20}$-alkoxy-$C_2$–$C_4$-alkyl groups,
(2) N-$C_8$–$C_{20}$-alkylamino-$C_2$–$C_8$-alkanoic acids,
(3) diaryl- or triarylamines,
(4) acidic and neutral phosphates based on ethylene oxide (EO) adducts and/or propylene oxide (PO)/EO adducts with $C_3$–$C_{18}$-alkanols, on polypropylene glycol, on polyethylene glycol and on block copolymers of EO and PO,
(5) sulfuric acid half esters based on $C_{10}$–$C_{20}$-fatty alcohols and $C_5$–$C_{20}$-alkylphenol/EO adducts,
(6) $C_8$–$C_{20}$-alkane- and alkenesulfonic acids, $C_6$–$C_{20}$-alkylbenzenesulfonic acids, $C_1$–$C_{20}$-alkylnaphthalenesulfonic acids and di-$C_6$–$C_{20}$-alkylsulfimides,
(7) adducts of EO with $C_1$–$C_{20}$-alkylphenols, with $C_8$–$C_{20}$-alkanols (fatty alcohols) and with $C_{10}$–$C_{20}$-alkylamines, the adducts containing on average not less than 5 moles of EO per mole,
(8) propylene glycols, block copolymers based on alkanediols and alkanepolyols of 2 to 8 carbon atoms, containing from 3 to 5 hydroxyl groups, with PO and EO and EO adducts of $C_2$–$C_8$-alkanediols and $C_2$–$C_8$-alkanepolyols containing from 3 to 5 hydroxyl groups, and
(9) naphthols and alkylphenols, and mixtures of these agents.

Specific examples of additives are:
(1)(a) primary amines: decylamine, dodecylamine, tridecylamine, tetradecylamine, hexadecylamine, octadecylamine, 2-octyloxyethylamine, 3-octyloxypropylamine, 3-(2′-ethylhexyloxy)-propylamine, 3-decyloxypropylamine, 3-dodecyloxypropylamine, 3-tetradecyloxypropylamine, 3-octadecyloxypropylamine, 3-hexadecyloxypropylamine and the corresponding 2-alkoxyethylamines, tallow fatty amine, coconut fatty amine and soybean amine;
(1)(b) secondary and tertiary amines: preferably mono-N- and di-N,N-$C_1$–$C_4$-alkyl-N-$C_{10}$–$C_{20}$-alkylamines or N-($C_8$–$C_{20}$-alkoxy-$C_2$–$C_4$-alkyl)-amines, e.g. N-methyloctadecylamine, N,N-dimethyloctadecylamine, N,N-diethyloctadecylamine, N,N-dipropyloctadecylamine, N,N-dimethylhexadecylamine, N,N-dimethyltetradecylamine, N,N-dimethyldodecylamine, N,N-dimethyl-3-octadecyloxypropylamine, N,N-diethyl-3-octadecyloxypropylamine, N,N-dibutyl-3-octadecyloxypropylamine, N,N-dimethyl-3- hexadecyloxypropylamine, N,N-dimethyl-3-tetradecyloxypropylamine, N,N-dimethyl-3-dodecyloxypropylamine, N,N-dimethyl-3-decyloxypropylamine, N,N-dimethyl-3-octyloxypropylamine, N,N-dimethyl-3-(2'-ethylhexyloxy)-propylamine or industrial mixtures, such as coconut secondary fatty amines.

(2) Alkylaminoalkanoic acids: preferably N-$C_8$–$C_{18}$-alkylaminobutyric acids, such as N-$C_{18}$-alkylaminobutyric acid, N-$C_{16}$-alkylaminobutyric acid, N-coconut fat-$\beta$-aminobutyric acid, N-$C_{14}$-alkylaminobutyric acid, N-$C_{12}$-alkylaminobutyric acid, N-$C_{10}$-alkylaminobutyric acid and N-$C_8$-alkylaminobutyric acid.

(3) Diaryl- and triarylamines: diphenylamine, N-methyldiphenylamine, N-ethyldiphenylamine, N-4-methylphenylaniline, N-4-methoxyphenylaniline, triphenylamine, N-phenyl-naphthylamine.

(4)(a) Neutral phosphates: tri-$C_3$–$C_{18}$-alkyl phosphates, such as tri-n-propyl phosphate, tributyl phosphate, trihexyl phosphate, trioctyl phosphate, trinonyl phosphate, tridecyl phosphate, tridodecyl phosphate, tritetradecyl phosphate, trihexadecyl phosphate and trioctyldecyl phosphate, these esters preferably being used together with nonionic assistants (7).

(4)(b) Acidic phosphates based on oxoalcohol fatty alcohol oxyalkylates, such as fatty alcohol/EO and fatty alcohol/PO/EO adducts, polypropylene glycol, polyethylene glycol, and PO/EO block copolymers: mono- and diesters of phosphoric acid with reaction products of $C_8$–$C_{20}$-alkanols with EO, PO or PO+EO, such as $C_8$–$C_{12}$-oxoalcohols (mixtures) with from 2 to 50, preferably from 2 to 20, moles of EO per mole of alcohol, dodecanol with from 3 to 5 moles of EO, n- and isodecanol with from 3 to 5 moles of EO, $C_{12}$–$C_{16}$-alkanol mixtures with from 3 to 20 moles of EO, $C_{16}$-alkanols with from 3 to 20 moles of EO, stearyl alcohol with from 3 to 20 moles of EO, myristyl alcohol with from 3 to 20 moles of EO, coconut fatty alcohol with from 3 to 20 moles of EO, $C_8$–$C_{12}$-oxoalcohols with from 3 to 20 moles of PO, and $C_{11}$–$C_{16}$-alkanol mixtures with from 3 to 20 moles of PO, and with products obtained by reacting $C_8$–$C_{12}$-oxoalcohol mixtures with from 3 to 10 moles of PO and then with from 5 to 25 moles of EO, or reacting $C_{13}$–$C_{15}$-oxoalcohol mixtures with from 3 to 10 moles of PO and then with from 5 to 25 moles of EO, or with reaction products of n- and isodecanol with from 3 to 10 moles of PO and from 5 to 25 moles of EO, dodecanol with from 3 to 10 moles of PO and from 5 to 25 moles of EO, $C_{16}$-fatty alcohol with from 3 to 10 moles of PO and from 5 to 25 moles of EO, myristyl alcohol with from 3 to 10 moles of PO and from 5 to 25 moles of EO, coconut fatty alcohol with from 3 to 10 moles of PO and from 5 to 25 moles of EO, and stearyl alcohol with from 3 to 10 moles of PO and from 5 to 25 moles of EO.

The acidic phosphates contain 1 or 2 of these radicals and are, as a rule, mixtures of the monoesters and diesters.

(5) Sulfuric acid half esters of fatty alcohols of 10 to 20 carbon atoms, of EO adducts of these fatty alcohols and of $C_5$–$C_{20}$-alkylphenol/EO adducts: stearyl sulfate, palmityl sulfate, $C_{11}$–$C_{13}$-alkanol sulfates, coconut fatty alcohol sulfate, dodecyl sulfate, $C_{13}$–$C_{15}$-fatty alcohol sulfates, sulfuric acid half esters of adducts of $C_{12}$–$C_{14}$ fatty alcohols with from 2 to 10 (in particular from 2 to 6) moles at EO, stearyl alcohol with from 2 to 6 moles of EO, palmityl alcohol with from 2 to 6 moles of EO, coconut fatty alcohol with from 2 to 10 moles of EO, dodecanol with from 2 to 10 moles of EO and $C_{11}$–$C_{13}$-oxoalcohols with from 2 to 6 moles of EO, sulfuric acid half esters of adducts of from 2 to 10 moles of EO with hexylphenol, n- and isooctylphenol, isononylphenol, decylphenol, dodecylphenol, tetradecylphenol, hexadecylphenol and octadecylphenol and with mixtures of $C_8$/$C_{11}$-alkylphenols.

(6) Alkane- and alkenesulfonic acids, alkylbenzenesulfonic acids and alkylnaphthalenesulfonic acids: n- and isooctanesulfonic acid, nonanesulfonic acid, decanesulfonic acid or dodecanesulfonic acid, tridecanesulfonic acid, tetradecanesulfonic acid, hexadecanesulfonic acid and octadecanesulfonic acid; hexylbenzenesulfonic acid, octylbenzenesulfonic acid, nonylbenzenesulfonic acid, decylbenzenesulfonic acid, dodecylbenzenesulfonic acid, tridecylbenzenesulfonic acid, tetradecylbenzenesulfonic acid, hexadecylbenzenesulfonic acid and octadecylbenzenesulfonic acid; and 1- and 2-naphthalenesulfonic acid, n- and isobutylnaphthalenesulfonic acid, isopropylnaphthalenesulfonic acid, isohexylnaphthalenesulfonic acid and isooctylnaphthalenesulfonic acid.

(7) Adducts of EO with alkylphenols, fatty alcohols and alkylamines:
  (a) examples of phenols are hexylphenol, isooctylphenol, nonylphenol, decylphenol, dodecylphenol, tridecylphenol, tetradecylphenol, hexadecylphenol and octadecylphenol with from 5 to 60, preferably from 5 to 30, moles of EO per mole of phenol;
  (b) examples of suitable fatty alcohols are octanol, nonanol, decanol, dodecanol, tetradecanol, tridencanol, hexadecanol, octadecanol, $C_8$–$C_{11}$-oxoalcohol mixtures, $C_{11}$–$C_{15}$-oxoalcohol mixtures, a $C_{13}$–$C_{15}$-oxoalcohol mixture, coconut fatty alcohol, stearyl alcohol and palmityl alcohol with from 5 to 60, preferably from 5 to 25, moles of EO per mole of alcohol.

(8) Polypropylene glycol and block copolymers of EO/PO with alkanediols and alkanepolyols:
  (a) Polypropylene glycol having a mean molecular weight of from 500 to 5000,
  (b) EO/PO block copolymers obtained by reacting alkanediols/alkanepolyols with PO and then reacting the product with EO. Examples of alkanediols and alkanepolyols are glycol, propylene glycol, butane-1,4-diol, butane-1,2-diol, butane-2,3-diot, hexane-1,6-diol, octanediol, glycerol, butanetriol, trimethylolpropane and sorbitol.

The EO content can be from 20 to 70% by weight, based on the polymer, the molecular weight can be from about 1000 to 50,000.

(9) Naphthols and alkylphenols: $\alpha$- and $\beta$-naphthol, 3,4-dimethylphenol, hexylphenol, octylphenol, nonylphenol and dodecylphenol.

Among the agents stated under (1) to (9), those of groups (1), (2), (4), (5), (6) and (7) are preferred.

Particularly noteworthy among these are:

(1.1) $C_{10}$–$C_{20}$-alkylamines, N-$C_1$–$C_4$-alkyl-N-$C_{10}$–$C_{20}$-alkylamines, di-N,N-$C_1$–$C_4$-alkyl-N-$C_{10}$–$C_{20}$-alkylamines, $C_8$–$C_{18}$-alkoxypropylamines, di-N,N-$C_1$–$C_4$-alkyl-N-$C_8$–$C_{18}$-alkoxypropylamines;

(2.1) N-$C_{10}$–$C_{20}$-alkylamino-$C_2$–$C_8$-alkanoic acids, in particular the N-$C_{10}$–$C_{20}$-alkylaminobutyric acids;

(4.1)(a) neutral phosphates of $C_3$–$C_{18}$-alkanols, as a mixture with nonionic EO adducts from group (7) or (7.1);
(4.1)(b) acidic phosphates based on adducts of EO or PO/EO with $C_{10}$–$C_{20}$-alkanols;
(5.1) sulfuric acid half esters of adducts of $C_{10}$–$C_{20}$-alkanols or of $C_6$–$C_{20}$-alkylphenols with from 2 to 6 moles of EO per mole;
(6.1) $C_8$–$C_{20}$-alkylbenzenesulfonic acids;
(7.1) adducts of $C_6$–$C_{20}$-alkylphenols and of $C_8$–$C_{20}$-alkanols with from 7 to 55 moles of EO per mole of phenol or alkanol; and
(9.1) the phenols and naphthols stated under (9).

Other noteworthy substances are:
(10) Mixtures of acidic phosphates of group (4 b), especially (4.1 b), with amines of group (1), in particular group (1.1), and
(11) mixtures of alkylbenzenesulfonic acids of group (6), especially group (6.1), with amines of group (1), in particular group (1.1).

The following are particularly preferred:
(1.2) $C_{14}$–$C_{20}$-alkylamines, 3-($C_{10}$–$C_{20}$-alkoxy)propylamines, where the N atoms of the amines are unsubstituted or monosubstituted or disubstituted by $C_1$–$C_4$-alkyl, preferably methyl or ethyl, in particular stearylamine and di-$C_1$–$C_4$-alkylstearylamines, such as N,N-dimethyl- and N,N-diethylstearylamine, and the agents stated under (2.1), (4.1), (5.1), (6.1), (7.1), (9) and (10).

The amounts of additives (1) to (11) are from 5 to 50, preferably from 10 to 45, % by weight, based on the amount of basic dye used for the laking procedure.

Particularly good results are obtained using additives in amounts of from 15 to 40% by weight, based on basic dye used.

The additives can be added before the laking procedure, for example to the solution of the basic dye or to the solution of the heteropolyacid, separately from the heteropolyacid during the laking procedure, or to the suspension of the lake after the laking procedure. Advantageously, the additives are used in the form of an aqueous solution or suspension.

The after-treatment of the crude pigment (lake) is carried out at a pH of from 2 to 5, preferably from 2.2 to 4, and at from 50° to 100° C., preferably 75° to 95° C., as a rule for from 10 to 120 minutes, preferably from 30 to 60 minutes.

The amount of additive, the duration of the aftertreatment and the temperature at which it is carried out are dependent on the lakes. The optimum amounts of additive and the most advantageous temperature can be determined by simple series of experiments.

The Examples which follow illustrate the process according to the present invention. Parts and percentages are by weight. EO is ethylene oxide and PO is propylene oxide.

EXAMPLE 1

A phosphomolybdic acid solution prepared in a conventional manner from 27.0 parts of molybdenum oxide and 2.55 parts of disodium phosphate in 255 parts of water was added to an aqueous solution of 38.6 parts of C.I. Basic Blue 7 (C.I. No. 42,595) in 2700 parts of water, the pigment being precipitated as a result of the addition. 4.9 parts of an acidic phosphate which contained, as the ester group, a product obtained by reacting a $C_{13}$–$C_{15}$-oxoalcohol mixture with 6 moles of PO and then with 12 moles of EO per mole of alcohol were added to this suspension. The pigment suspension was stirred for one hour at 75° C., after which 1.74 parts of sodium ethylenediaminetetraacetate and 8.3 parts of an emulsion prepared from 0.53 part of oleic acid ethanolamide, 1.13 parts of normal $C_{13}$–$C_{15}$-paraffin and 6.64 parts of water at 60° C. were added, as described in German Laid-Open Application DOS 2,707,972. The suspension was stirred for a further hour, after which the pigment was isolated, and dried in a through-circulation oven at 75° C. Milling gave a readily dispersible pigment which, when incorporated in an offset varnish, provided a printing ink having more finely divided particles and greater flow than that obtained using the pigment prepared as described in Comparative Example 1. When the first-mentioned pigment was milled in a nitrocellulose binder (14 parts of nitrocellulose and 3.5 parts of di-n-butyl phthalate dissolved in 20 parts of ethyl acetate and 62.5 parts of ethanol), a printing ink was obtained which, on aluminum foil or acetate film, gave colorations having higher gloss and higher transparency than an ink which contains the pigment of Comparative Example 1.

COMPARATIVE EXAMPLE 1

An aqueous solution of 38.6 parts of C.I. Basic Blue 7 (C.I. No. 42,595) in 2700 parts of water was converted to a lake with an aqueous heteropolyacid solution prepared in a conventional manner from 27.0 parts of molybdenum oxide and 2.55 parts of disodium phosphate in 255 parts of water. The pigment suspension was stirred for a further 15 minutes, and 1.74 parts of sodium ethylenediaminetetraacetate and 8.3 parts of an emulsion prepared from 0.53 part of oleic acid ethanolamide, 1.13 parts of a normal $C_{13}$–$C_{15}$-paraffin and 6.64 parts of water at 60° C. were added. Stirring was carried out for one hour, after which the pigment was isolated, dried at 75° C. in a through-circulation oven and milled.

EXAMPLE 2

Example 1 was repeated, except that, instead of the acidic phosphate stated there, a mixture of 3.9 parts of triisobutyl phosphate, 1.25 parts of an adduct of 20 moles of EO with 1 mole of isononylphenol and 0.29 part of an adduct of 5 moles of EO with 1 mole of isodecanol was used. The resulting pigment had virtually the same properties as the pigment prepared as described in Example 1.

EXAMPLE 3

The procedure described in Example 2 was followed, except that the laking procedure was carried out using a heteropolyacid solution prepared in a conventional manner from 80.7 parts of molybdenum oxide, 186.5 parts of tungsten oxide and 27.6 parts of disodium phosphate in 1200 parts of water. Compared with the product obtained as described in German Laid-Open Application DOS 2,707,972, Example 3, the pigment obtained had the advantageous performance characteristics stated in Example 1, when used in offset inks and nitrocellulose-containing inks.

EXAMPLE 4

The procedure described in Example 1 was repeated, except that, instead of C.I. Basic Blue 7, 35.9 parts of C.I. Basic Green 1 (C.I. No. 42,040) were converted to a lake with a phosphomolybdic acid. Compared with the pigment of Comparative Example 2, the resulting pigment had the advantageous performance characteristics described in Example 1, when used in offset printing inks and nitrocellulose-containing printing inks.

COMPARATIVE EXAMPLE 2

Instead of C.I. Basic Blue 7, 35.9 g of C.I. Basic Green 1 (C.I. No. 42,040) were converted to a lake as described in Comparative Example 1.

EXAMPLE 5

A heteropolyacid solution prepared in a conventional manner from 33.2 parts of molybdenum oxide, and 3.14 parts of disodium phosphate in 320 parts of water was added to a solution of 38 parts of Basic Violet 1 (C.I. No. 42,535) in 2800 parts of water, the pigment being precipitated. 10 parts of an acidic phosphate, which contained, as the ester group, a product obtained by reacting a $C_{13}$–$C_{15}$-oxoalcohol mixture with 6 moles of PO and then with 12 moles of EO per mole of alcohol, were added to this suspension. Stirring was carried out for one hour at 80° C., after which 2 parts of sodium ethylenediaminetetraacetate and 16 parts of an emulsion prepared from 1.02 parts of oleic acid ethanolamide, 2.18 parts of a normal $C_{13}$–$C_{15}$-paraffin and 12.8 parts of water at 60° C. were added to the pigment suspension as described in German Laid-Open Application DOS 2,707,972. Stirring was continued for a further hour, after which the pigment was isolated, and dried at 75° C. in a through-circulation oven. Compared with the pigment of Comparative Example 3, the pigment prepared by this process had the advantageous performance characteristics stated in Example 1.

COMPARATIVE EXAMPLE 3

The phosphomolybdic acid solution according to Example 5 was added to an aqueous solution of 38 parts of C.I. Basic Violet 1 (C.I. No. 42,535) in 2800 parts of water, the pigment being precipitated. Thereafter, 2 parts of sodium ethylenediaminetetraacetate and 16 parts of emulsion were added, as described in Example 5. The suspension was stirred for one hour at 80° C., after which the pigment was isolated, and dried at 75° C. in a through-circulation oven.

COMPARATIVE EXAMPLE 4

Comparative Example 3 was repeated, except that the pigment suspension was stirred for one hour at 90° C. instead of 80° C.

COMPARATIVE EXAMPLE 5

The procedure described in Comparative Example 3 was followed, except that, instead of C.I. Basic Violet 1 (C.I. No. 42,535), 38 parts of C.I. Basic Violet 3 (C.I. No. 42,555) were used for the laking procedure.

COMPARATIVE EXAMPLE 6

Comparative Example 5 was repeated, except that the pigment suspension was stirred for one hour at 90° C. instead of 80° C.

EXAMPLE 6

The procedure described in Example 5 was followed, except that, instead of C.I. Basic Violet 1 (C.I. No. 42,535), 38 parts of C.I. Basic Violet 3 (C.I. No. 42,555) were used for the laking procedure. Compared with the pigment of Comparative Example 5, the pigment obtained had the advantageous performance characteristics stated in Example 1.

EXAMPLE 7

Example 5 was repeated, except that, instead of the acidic phosphate, 13 parts of dodecylbenzenesulfonic acid were added to the crude pigment suspension. Furthermore, stirring was then carried out for one hour at 90° C. instead of 80° C. Compared with the pigment of Comparative Example 4, the pigment obtained had the advantageous performance characteristics stated in Example 1.

EXAMPLE 8

Example 6 was repeated, except that 10 parts of a reaction product of nonylphenol with 10 moles of EO were used instead of the acidic phosphate. Moreover, stirring was then continued for one hour at 90° C. instead of 80° C. Compared with the pigment of Comparative Example 6, the pigment obtained had the advantageous performance characteristics stated in Example 1.

EXAMPLE 9

Example 5 was repeated, except that 10 parts of a reaction product of isodecanol with 7 moles of EO were used instead of the acidic phosphate. Furthermore, stirring was then continued for one hour at 90° C. instead of 80° C. Compared with the pigment of Comparative Example 4, the pigment obtained had the advantageous performance characteristics stated in Example 1.

EXAMPLE 10

The procedure described in Example 5 was followed, except that 10 parts of a sodium salt of a sulfated $C_{12}$–$C_{14}$-alcohol/EO adduct were used instead of the acidic phosphate. Furthermore, the pigment suspension was then stirred for a further hour at 90° C. instead of 80° C. Compared with the pigment of Comparative Example 4, the pigment obtained had the advantageous performance characteristics stated in Example 1.

EXAMPLE 11

The procedure described in Example 5 was followed, except that 6.8 parts of dodecylbenzenesulfonic acid and 6.2 parts of N,N-dimethyloctadecylamine were used instead of the acidic phosphate. Furthermore, the pigment suspension was then stirred for a further hour at 90° C. instead of 80° C. Compared with the pigment of Comparative Example 4, the pigment obtained had the advantageous performance characteristics stated in Example 1.

EXAMPLE 12

Example 5 was repeated, except that 13 parts of β-naphthol were used instead of the acidic phosphate. Compared with the pigment of Comparative Example 4, the pigment obtained had the advantageous performance characteristics stated in Example 1.

EXAMPLE 13

A heteropolyacid prepared in a conventional manner from 4.96 parts of molybdenum oxide, 35.16 parts of tungsten oxide and waterglass consisting of 0.59 part of silica in 380 parts of water was added to an aqueous solution of 38.6 parts of C.I. Basic Blue 7 (C.I. No. 42,595) in 2700 parts of water, the pigment being precipitated. 9.6 parts of an acidic phosphate, which contained, as the ester group, a product obtained by reacting a $C_{13}$–$C_{15}$-oxoalcohol mixture with 6 moles of PO and then with 12 moles of EO per mole of alcohol, were added to this suspension. Stirring was carried out for one hour at 80° C., after which 1.74 parts of sodium ethylenediaminetetraacetate and 8.3 parts of an emulsion prepared from 0.53 part of oleic acid ethanolamide, 1.13 parts of a normal $C_{13}$–$C_{15}$-paraffin and 6.64 parts of water at 60° C. were added to the pigment suspension as described in German Laid-Open Application DOS 2,707,972. Stirring was continued for a further hour at 80° C., after which the pigment was isolated, and dried at 75° C. in a through-circulation oven. Milling gave a readily dispersible powder which had the performance characteristics stated in Example 1. Compared with the pigment of Comparative Example 7, the novel method gives colorations having higher gloss and higher transparency.

COMPARATIVE EXAMPLE 7

A heteropolyacid prepared in a conventional manner from 4.96 parts of molybdenum oxide, 35.16 parts of tungsten oxide and waterglass consisting of 0.59 part of silica in 380 parts of water was added to an aqueous solution of 38.6 parts of C.I. Basic Blue 7 (C.I. No. 42,595) in 2700 parts of water, the pigment being precipitated. The pigment suspension was stirred for a further 15 minutes, and 1.74 parts of sodium ethylenediaminetetraacetate and 8.3 parts of an emulsion prepared from 0.53 part of oleic acid ethanolamide, 1.13 parts of a normal $C_{13}$–$C_{15}$-paraffin and 6.64 parts of water at 60° C. were added. The mixture was stirred for one hour, after which the pigment was isolated, dried at 75° C. in a through-circulation oven and milled.

EXAMPLE 14

A phosphomolybdic acid prepared in a conventional manner from 48.51 parts of molybdenum oxide and 4.34 parts of disodium phosphate in 945 parts of water was added to a mixture of 55.35 parts of C.I. Basic Red 1 (C.I. No. 45,160), and 1.0 part of C.I. Basic Violet 11 (C.I. No. 45,175) in 2000 parts of water, the pigment being precipitated. A mixture of 7.19 parts of triisobutyl phosphate, 2.29 parts of an adduct of 20 moles of EO which 1 mole of isononylphenol and 0.52 part of an adduct of 5 moles of EO with 1 mole of isodecanol was added to the pigment suspension. Stirring was carried out for 1 hour at 70° C., after which 8.3 parts of an emulsion prepared from 0.53 part of oleic acid ethanolamide, 1.13 parts of a normal $C_{13}$–$C_{15}$-paraffin and 6.64 parts of water at 60° C. were added to the suspension, and the latter was stirred for a further hour at 70° C. Thereafter, the pigment was isolated, and dried at 75° C. in a through-circulation oven. Compared with the pigment of Comparative Example 8, the pigment obtained gave colorations and prints having higher gloss and higher transparency.

COMPARATIVE EXAMPLE 8

A phosphomolybdic acid prepared in a conventional manner from 48.51 parts of molybdenum oxide and 4.34 parts of disodium phosphate in 945 parts of water was added to a mixture of 55.35 parts of C.I. Basic Red 1 (C.I. No. 45,160) and 1.0 part of C.I. Basic Violet 11 (C.I. No. 45,175) in 2000 parts of water, the pigment being precipitated. The suspension was stirred for 15 minutes at 70° C., after which 8.3 parts of an emulsion prepared from 0.53 part of oleic acid ethanolamide, 1.13 parts of a normal $C_{13}$–$C_{15}$-paraffin and 6.64 parts of water at 60° C. were added. Stirring was continued for a further hour at 70° C., after which the pigment was isolated, dried at 75° C. in a through-circulation oven and milled.

EXAMPLE 15

A phosphomolybdic acid solution prepared in a conventional manner from 27.0 parts of molybdenum oxide and 2.55 parts of disodium phosphate in 255 parts of water was added to an aqueous solution of 38.6 parts of C.I. Basic Blue 7 (C.I. No. 42,595) in 2700 parts of water, the pigment being precipitated. 9.6 parts of an acidic phosphate, which contained, as the ester group, a product obtained by reacting a $C_{13}$–$C_{15}$-oxoalcohol mixture with 6 moles of PO and then with 12 moles of EO per mole of alcohol, were added to this suspension. Stirring was carried out for one hour at 70° C., after which the pigment was isolated, and dried at 75° C. in a through-circulation oven. Milling gave a readily dispersible powder which, when incorporated in an offset varnish, provided a printing ink having more finely divided particles and greater flow than the ink obtained using the pigment prepared as described in Comparative Example 9. When the pigment prepared according to the invention was milled in a nitrocellulose binder (14 parts of nitrocellulose and 3.5 parts of di-n-butyl phthalate dissolved in 20 parts of ethyl acetate and 62.5 parts of ethanol), a printing ink was obtained which, on aluminum foil or acetate film, gave colorations having higher gloss and higher transparency than colorations obtained with an ink which contained the pigment of Comparative Example 9.

COMPARATIVE EXAMPLE 9

An aqueous solution of 38.6 parts of C.I. Basic Blue 7 (C.I. No. 42,595) in 2700 parts of water was converted to a lake with an aqueous heteropolyacid solution prepared in a conventional manner from 27.0 parts of molybdenum oxide and 2.55 parts of disodium phosphate in 255 parts of water. The mixture was stirred for one hour at 70° C., after which the pigment was isolated, dried at 75° C. in a through-circulation oven and milled.

EXAMPLE 16

A phosphomolybdic acid solution prepared in a conventional manner from 27.0 parts of molybdenum oxide and 2.55 parts of disodium phosphate in 255 parts of water was added to a mixture of 9.6 parts of an acidic phosphate, which contained, as the ester group, a product obtained by reacting a $C_{13}$–$C_{15}$-oxoalcohol mixture with 6 moles of PO and then with 12 moles of EO per mole of alcohol, and 38.6 parts of C.I. Basic Blue 7 (C.I. No. 42,595) in 2700 parts of water, the pigment being precipitated. Stirring was carried out for one hour at 70° C., after which the pigment was isolated, and dried at 75° C. in a through-circulation oven. Milling gave a readily dispersible pigment which, compared with the pigment of Comparative Example 9, had the advantageous performance characteristics stated in Example 1.

EXAMPLE 17

A heteropolyacid solution prepared in a conventional manner from 51.6 parts of molybdenum oxide and 4.88 parts of disodium phosphate in 497 parts of water was added to a mixture of 38 parts of Basic Violet 1 (C.I. No. 42,535) and 15 parts of N,N-dimethyloctadecylamine in 2800 parts of water, the pigment being precipitated. Stirring was carried out for one hour at 90° C., after which 2 parts of sodium ethylenediaminetetraacetate and 16 parts of an emulsion prepared from 1.02 parts of oleic acid ethanolamide, 2.18 parts of a normal $C_{13}$–$C_{15}$-paraffin and 12.8 parts of water at 60° C. were added to the pigment suspension, as described in German Laid-Open Application DOS 2,707,972. Stirring was continued for a further hour, after which the pigment was isolated, and dried at 75° C. in a through-circulation oven. Compared with the pigment of Comparative Example 4, the pigment obtained had the advantageous performance characteristics stated in Example 1.

EXAMPLE 18

A mixture of 15 parts of dodecylbenzenesulfonic acid and a heteropolyacid solution prepared in a conventional manner from 33.2 parts of molybdenum oxide and 3.14 parts of disodium phosphate in 320 parts of water was added to a solution of 38 parts of Basic Violet 1 (C.I. No. 42,535) in 2800 parts of water, the pigment being precipitated. The pigment suspension was stirred for one hour at 90° C., after which 2 parts of sodium ethylenediaminetetraacetate and 16 parts of an emulsion prepared from 1.02 parts of oleic acid ethanolamide, 2.18 parts of a normal $C_{13}$–$C_{15}$-paraffin and 12.8 parts of water at 60° C. were added, as described in German Laid-Open Application DOS 2,707,972. Stirring was continued for a further hour, after which the pigment was isolated, and dried at 75° C. in a through-circulation oven. Compared with the pigment of Comparative Example 4, the pigment obtained had the advantageous performance characteristics stated in Example 1.

EXAMPLE 19

The procedure described in Example 18 was followed, except that 15 parts of a sodium salt of a sulfated $C_{12}$–$C_{14}$-alcohol/EO adduct were used instead of the dodecylbenzenesulfonic acid. Compared with the pigment of Comparative Example 4, the pigment obtained had the advantageous performance characteristics stated in Example 1.

We claim:

1. A process for the preparation of a lake which has improved performance characteristics and is obtained from a basic dye and a heteropolyacid based on phosphoric acid, molybdic acid, tungstic acid or silicic acid by after-treating the crude pigment obtained during the laking procedure, in aqueous suspension and at elevated temperatures, wherein from 5 to 50% by weight based on the dye used for the laking procedure, of at least one compound selected from the group consisting of
   (1) primary, secondary or tertiary aliphatic amines which carry one or more $C_{10}$–$C_{20}$-alkyl or $C_8$–$C_{20}$-alkoxy-$C_2$–$C_4$-alkyl groups,
   (2) N-$C_8$–$C_{20}$-alkylamino-$C_2$–$C_8$-alkanoic acids,
   (3) diaryl- or triarylamines,
   (4) acidic or neutral phosphates based on a fatty alcohol, a fatty alcohol oxyalkylate, polypropylene glycol, polyethylene glycol or block copolymers of propylene oxide and ethylene oxide,
   (5) sulfuric acid half esters based on $C_{10}$–$C_{20}$-fatty alcohols, fatty alcohol/ethylene oxide adducts or $C_5$–$C_{20}$-alkylphenol/ethylene oxide adducts,
   (6) $C_8$–$C_{20}$-alkane- or alkenesulfonic acids, $C_6$–$C_{20}$-alkylbenzenesulfonic acids, $C_1$–$C_{20}$-alkylnaphthalene sulfonic acids or di-$C_6$–$C_{20}$-alkylsulfimides,
   (7) ethylene oxide adducts of $C_1$–$C_{20}$-alkylphenols, $C_8$–$C_{20}$-alkanols or $C_{10}$–$C_{20}$-alkylamines, the adducts containing not less than 5 ethylene oxide radicals,
   (8) propylene glycols or block copolymers based on alkanediols or -polyols of 2 to 8 carbon atoms with propylene oxide ad ethylene oxide, and
   (9) naphthols or $C_1$–$C_{20}$-alkylphenols, or mixtures of these are added to the aqueous mixtures before, during or after the laking procedure, the crude pigment in the aqueous suspension is heated to 50°–100° C. at pH 2–5, and the pigment is then isolated.

2. A process as claimed in claim 1, wherein from 10 to 45% by weight, based on the dye used for the laking procedure, of the agents stated under (1) to (9) is used.

3. A process as claimed in claim 1, wherein the heat treatment of the crude pigment is carried out in the presence of
   (1.1) a $C_{10}$–$C_{20}$-alkylamine or a 3-($C_8$–$C_{20}$-alkoxy)-propylamine, where the N atom in the amine may be substituted by 1 or 2 $C_1$–$C_4$-alkyl radicals,
   (2.1) an N-$C_{10}$–$C_{20}$-alkylamino-$C_2$–$C_8$-alkanoic acid,
   (4.1)(a) a neutral phosphate based on a $C_3$–$C_{18}$-alkanol, as a mixture with nonionic ethylene oxide adducts of group (7),
   (b) an acidic phosphate based on an adduct of ethylene oxide or of propylene oxide/ethylene oxide with a $C_{10}$–$C_{20}$-alkanol,
   (5.1) a sulfuric acid half ester of an adduct of ethylene oxide with a $C_{10}$–$C_{20}$-alkylphenol, the adduct containing on average from 2 to 6 moles of ethylene oxide per mole,
   (6.1) a $C_8$–$C_{20}$-alkylbenzenesulfonic acid,
   (7.1) an adduct of ethylene oxide with a $C_6$–$C_{20}$-alkylphenol or a $C_8$–$C_{20}$-alkanol, containing from 5 to 55 moles of ethylene oxide per mole of phenol or alkanol, or a mixture or these agents.

4. A process as claimed in claim 1, wherein the heat treatment of the crude pigment is carried out in the presence of
   (1.2) a $C_{14}$–$C_{20}$-alkylamine or a 3-($C_{10}$–$C_{20}$-alkoxy)-propylamine, where the N atom may be substituted by one or two $C_1$–$C_4$-alkyl radicals,
   (2.2) a $\beta$-(N-$C_{10}$–$C_{20}$-alkylamino)-butyric acid,
   (4.2)(a) a neutral phosphate based on a $C_3$–$C_{18}$-alkanol, as a mixture with an adduct of ethylene oxide with a $C_6$–$C_{20}$-alkylphenol or a $C_8$–$C_{20}$-alkanol, containing from 5 to 55 moles of ethylene oxide per mole of phenol or alkanol,
   (4.2)(b) an acidic phosphate based on an adduct of ethylene oxide or of propylene oxide/ethylene oxide with a $C_{10}$–$C_{20}$-alkanol,
   (5.2) a sulfuric acid half ester of an adduct of ethylene oxide with a $C_{10}$–$C_{20}$-alkanol or a $C_6$–$C_{20}$-alkylphenol, the adduct containing on average from 2 to 6 moles of ethylene oxide per mole of alkanol or phenol,
   (6.2) a $C_8$–$C_{20}$-alkylbenzenesulfonic acid,
   (7.2) an adduct of ethylene oxide with a $C_6$–$C_{20}$-alkylphenol or a $C_8$–$C_{20}$-alkanol, the adduct containing from 5 to 55 moles of ethylene oxide per mole of phenol or alkanol,
   (10) a mixture of the acidic phosphates stated under (4.2.b) with a $C_{10}$–$C_{20}$-alkylamine or a 3-($C_8$–$C_{20}$-alkoxy)-propylamine, where the amino group may be substituted by one or two $C_1$–$C_4$-alkyl radicals, or
   (11) a mixture of a $C_8$–$C_{20}$-alkylbenzenesulfonic acid with a $C_{10}$–$C_{20}$-alkylamine or a 3-($C_8$–$C_{20}$-alkoxy)-propylamine, where the amino group may be substituted by one or two $C_1$–$C_4$-alkyl radicals.

5. A process as claimed in claim 4, wherein the agents (1) to (11) are used in the form of a solution or suspension.

6. A process as claimed in claim 5, wherein the agents (1) to (11) are added to an aqueous suspension of the crude pigment, the mixture is heated to 50°–100° C. at pH 2–5 with thorough mixing, and the pigment is then isolated.

7. A pigment which consists of a basic dye converted to a lake with a heteropolyacid and is obtained by a process as claimed in claim 1.

8. A process for the preparation of a lake which has improved performance characteristics and is obtained from a basic dye and a heteropolyacid based on phosphoric acid, molybdic acid, tungstic acid and/or silicic acid by after-treating the crude pigment obtained during the laking procedure, in aqueous suspension and at elevated temperatures, wherein the crude pigment is heated to 50°–100° C. at pH 2–5 in the presence of from 10 to 45% by weight, based on the dye used for the laking procedure, of one or more compounds from the groups consisting of
- (1.1) $C_{10}$–$C_{20}$-alkylamines or 3-($C_8$–$C_{20}$-alkoxy)-propylamines, where the N atoms of the amines may be monosubstituted or disubstituted by $C_1$–$C_4$-alkyl,
- (2.1) N-$C_{10}$–$C_{20}$-alkylamino-$C_2$–$C_8$-alkanoic acids,
- (4.1)(a) neutral phosphates based on $C_3$–$C_{18}$-alkanols, as a mixture with nonionic ethylene oxide adducts of group (7),
- (b) acidic phosphates based on adducts of ethylene oxide or of propylene oxide/ethylene oxide with $C_{10}$–$C_{20}$-alkanols,
- (5.1) sulfuric acid half esters of adducts of ethylene oxide with $C_{10}$–$C_{20}$-alkylphenols, the adducts containing on average from 2 to 6 moles of ethylene oxide per mole,
- (6.1) $C_8$–$C_{20}$-alkylbenzenesulfonic acids and
- (7.1) adducts of ethylene oxide with $C_6$–$C_{20}$-alkylphenols or $C_8$–$C_{20}$-alkanols, containing from 5 to 55 moles of ethylene oxide per mole of phenol or alkanol, and the pigment is then isolated.

9. A process as claimed in claim 8, wherein the heat-treatment of the crude pigment is carried out in the presence of
- (1.2) a $C_{14}$–$C_{20}$-alkylamine or a 3-($C_{10}$–$C_{20}$-alkoxy)-propylamine, where the N atom may be substituted by one or two $C_1$–$C_4$-alkyl radicals,
- (2.2) a β-(N-$C_{10}$–$C_{20}$-alkylamino)-butyric acid,
- (4.2)(a) a neutral phosphate based on a $C_3$–$C_{18}$-alkanol, as a mixture with an adduct of ethylene oxide with a $C_6$–$C_{20}$-alkylphenol or a $C_8$–$C_{20}$-alkanol, containing from 5 to 55 moles of ethylene oxide per mole of phenol or alkanol,
- (4.2)(b) an acidic phosphate based on an adduct of ethylene oxide or of propylene oxide/ethylene oxide with a $C_{10}$–$C_{20}$-alkanol,
- (5.2) a sulfuric acid half ester of an adduct of ethylene oxide with a $C_{10}$–$C_{20}$-alkanol or a $C_6$–$C_{20}$-alkylphenol, the adduct containing on average from 2 to 6 moles of ethylene oxide per mole of alkanol or phenol,
- (6.2) a $C_8$–$C_{20}$-alkylbenzenesulfonic acid,
- (7.2) an adduct of ethylene oxide with a $C_6$–$C_{20}$-alkylphenol or a $C_8$–$C_{20}$-alkanol, the adduct containing from 5 to 55 moles of ethylene oxide per mole of phenol or alkanol,
- (10) a mixture of the acidic phosphates stated under (4.2.b.) with a $C_{10}$–$C_{20}$-alkylamine or a 3-($C_8$–$C_{20}$-alkoxy)-propylamine, where the amino group may be substituted by one or two $C_1$–$C_4$-alkyl radicals, or
- (11) a mixture of a $C_8$–$C_{20}$-alkylbenzenesulfonic acid with a $C_{10}$–$C_{20}$-alkylamine or a 3-($C_8$–$C_{20}$-alkoxy)-propylamine, where the amino group may be substituted by one or two $C_1$–$C_4$-alkyl radicals.

10. A process as claimed in claim 8, wherein the heat treatment is carried out in the presence of from 15 to 45% by weight, based on the basic dye used for the laking procedure, of the compounds stated under (1.1) to (7.1).

11. A process as claimed in claim 9, wherein the heat treatment is carried out in the presence of from 15 to 45% by weight, based on the basic dye used for the laking procedure, of the compounds stated under (1.1) to (7.1).

12. A process for the preparation of a lake which has improved performance characteristics and is obtained from a basic dye and a heteropolyacid based on phosphoric acid, molybdic acid, tungstic acid and/or silicic acid by after-treating the crude pigment obtained during the laking procedure, in aqueous suspension and at elevated temperatures, wherein the crude pigment is heated to 50°–100° C. at pH 2–5 in the presence of from 10 to 45% by weight, based on the basic dye used for the laking procedure, of one or more compounds from the groups consisting of
- (1.2) $C_{14}$–$C_{20}$-alkylamines or 3-($C_{10}$–$C_{20}$-alkoxy)-propylamines, where the N atoms of the amines may carry one or two $C_1$–$C_4$-alkyl radicals,
- (2.2) N-$C_{10}$–$C_{20}$-alkylaminobutyric acids,
- (4.2)(a) neutral phosphates of $C_3$–$C_{18}$-alkanols, as a mixture with $C_6$–$C_{20}$-alkylphenol/ethylene oxide adducts or $C_8$–$C_{20}$-alkanol/ethylene oxide adducts, containing in each case from 5 to 55 moles of ethylene oxide per mole of phenol or alkanol,
- (4.2)(b) acidic phosphates of adducts of ethylene oxide or of propylene oxide/ethylene oxide with $C_{10}$–$C_{20}$-alkanols,
- (5.2) sulfuric acid half esters of adducts of ethylene oxide with $C_{10}$–$C_{20}$-alkanols or $C_6$–$C_{20}$-alkylphenols, the adducts containing on average from 2 to 6 moles of ethylene oxide per mole of alkanol or phenol,
- (6.2) $C_8$–$C_{20}$-alkylbenzenesulfonic acids,
- (7.2) adducts of ethylene oxide with $C_6$–$C_{20}$-alkylphenols or $C_8$–$C_{20}$-alkanols, the adducts containing from 5 to 55 moles of ethylene oxide per mole of alkylphenol or alkanol,
- (9.1) α-naphthol, β-naphthol, 3,4-dimethylphenol, hexylphenol, octylphenol, nonylphenol and dodecylphenol, and
- (10) mixtures of acidic phosphates of ethylene oxide/$C_{10}$–$C_{20}$-alkanol adducts or of propylene oxide/ethylene oxide/$C_{10}$–$C_{20}$-alkanol adducts with $C_{10}$–$C_{20}$-alkylamines, N-$C_1$–$C_4$-alkyl-N-$C_{10}$–$C_{20}$-alkylamines, di-N-$C_1$–$C_4$-alkyl-N-$C_{10}$–$C_{20}$-alkylamines, $C_8$–$C_{18}$-alkoxypropylamines or di-N,N-$C_1$–$C_4$-alkyl-N-$C_8$–$C_{18}$-alkoxypropylamines, and the pigment is then isolated.

13. A process as claimed in claim 12, wherein the heat treatment is carried out at a pH of from 2.2 to 4.

14. A process as claimed in claim 12, wherein the heat treatment is carried out at from 75 to 95° C.

15. A process as claimed in claim 13, wherein the heat treatment is carried out at a pH of from 2.2 to 4.

16. A pigment which consists of a basic dye converted to a lake with a heteropolyacid and is obtained by a process as claimed in claim 12.

* * * * *